United States Patent [19]

Mihara et al.

[11] Patent Number: 4,635,125
[45] Date of Patent: Jan. 6, 1987

[54] REAL-TIME LIGHT-MEASURING SYSTEM FOR SINGLE-LENS REFLEX CAMERAS

[75] Inventors: Shin-ichi Mihara; Toshihiro Imai; Kazuo Ikari, all of Hachiouji; Toru Fujii, Hino, all of Japan

[73] Assignee: Olympus Optical Co., Ltd., Tokyo, Japan

[21] Appl. No.: 724,336

[22] Filed: Apr. 17, 1985

[30] Foreign Application Priority Data

Apr. 18, 1984 [JP] Japan ............................... 59-076562

[51] Int. Cl.[4] ............................................ H04N 5/238
[52] U.S. Cl. ................................................ 358/228
[58] Field of Search ................ 358/228; 354/476, 479, 354/480

[56] References Cited

U.S. PATENT DOCUMENTS

| 3,086,077 | 4/1963 | Mayer | 358/228 |
| 3,385,190 | 5/1968 | Sho et al. | 354/479 |
| 3,451,324 | 6/1969 | Miyauchi | 354/476 |
| 4,152,054 | 5/1979 | Leiter | 354/476 |
| 4,556,912 | 12/1985 | Yamanaka et al. | 358/228 X |

FOREIGN PATENT DOCUMENTS 57-114126  7/1982  Japan .

Primary Examiner—Donald A. Griffin
Attorney, Agent, or Firm—Cushman, Darby & Cushman

[57] ABSTRACT

A light-measuring system for single-lens reflex cameras wherein the light coming from an object to be photographed as reflected at the image-pickup surface is reflected once again by a partially reflecting means disposed in the photographing light path, so that this latter reflection light is measured on its own optical axis, to enable to perform the real-time measurement of light with a high precision.

5 Claims, 5 Drawing Figures ness of light-measuring.
REAL-TIME LIGHT-MEASURING SYSTEM FOR SINGLE-LENS REFLEX CAMERAS

BACKGROUND OF THE INVENTION (a) Field of the Invention

The present invention relates to a single-lens reflex camera, and more particularly it concerns a real-time light-measuring system for a single-lens reflex camera having an image-pickup surface of a high reflectivity (b) Description of the Prior Art Conventional real-time light-measuring systems for single-lens reflex cameras are designed to measure, by a light-measuring device via a light-measuring optical system disposed outside the photographing light path, a light reflected from an image-pickup surface. This conventional system will be briefed hereunder by referring to FIG. 1. Reference numeral 1 represents a quick return mirror of a single-lens reflex camera; 2 a photographing lens; 3 an image-pickup surface; 4 a light-measuring optical system disposed on the outside of the photographing light path; and 5 a light-measuring device. The said system comprising the above-mentioned parts is constructed to insure that, among the lights reflected at the image-pickup surface 3, the illustrated reflection light A impinges onto the light-measuring device 5 via the light-measuring optical system 4. In such a case, it should be noted that, since the image-pickup surface 3 represents an emulsion surface of an Ag-salt film, it has a high light diffusibility, leading to the advantage that, even when both the light-measuring optical system 4 and the light-measuring device 5 are positioned outside the photographing light path, there can arrive an ample amount of light at the light-measuring device 5, and accordingly an adequate measurement of light can be achieved. However, in a single-lens reflex camera designed to perform image-pickup by means of an electronic image-pickup tube or a solid-state image-pickup device, it should be noted that the image-pickup surface of such a camera has a very high reflectivity, i.e. a low light diffusibility. Accordingly, in case both the light-measuring optical system 4 and the light-measuring device 5 are disposed outside the photographing light path as shown in FIG. 1, there can not arrive a sufficient amount of light at the light-measuring device 5. Thus, such a prior art light-measuring system has not been suitable for use as the real-time light-measuring system of a single-lens reflex camera which requires a specially high precision performance of light-measuring.

SUMMARY OF THE INVENTION

In view of the aforesaid problems of the prior art, it is the primary object of the present invention to provide a real-time light-measuring system designed to permit the measurement of light to be performed with a high precision in a single-lens reflex camera having an image-pickup surface of high reflectivity.

According to the present invention, this object can be attained by arranging so that the light coming from an object to be photographed as reflected at the image-pickup surface is reflected once again by a partially reflecting means disposed in the photographing light path, so that this latter reflection light is measured on its own optical axis. With this arrangement, an ample amount of light can arrive at the light-measuring device, making it possible to perform a real-time light-measurement with high precision.

According to a preferred formation of the present invention, said partially reflecting means is provided in the form of a cemented face of a cemented prism constructed to serve as a polarizer by the application of a thin film coating having a high refractive index, and further the light-measuring system comprises a polarizing plate disposed between the cemented face and a view-finder optical system, and a ¼ wavelength plate disposed between the cemented face and the image-pickup surface According to this formation, the entry of stray lights coming from the view-finder optical system into the light-measuring devive can be blocked, thus insuring always a high degree of precision to be obtained in the measurement of light.

According to another preferred formation of the present invention, there is disposed, in the light path of the view-finder, a dichroic mirror capable of reflecting lights of the near-infrared region, and the light-measuring device is formed so as to be sensitive to these near-infrared lights. This arrangement makes it possible to block those stray lights which come from the view-finder optical system and enter into the light-measuring device without requiring such items as a polarizing device, a ¼ wavelength plate and a polarizing plate This and other objects of the present invention will become more apparent during the course of the following detailed description and appended claims.

DETAILED DESCRIPTION OF THE PREFERRED EMBODIMENTS

Figure 1:
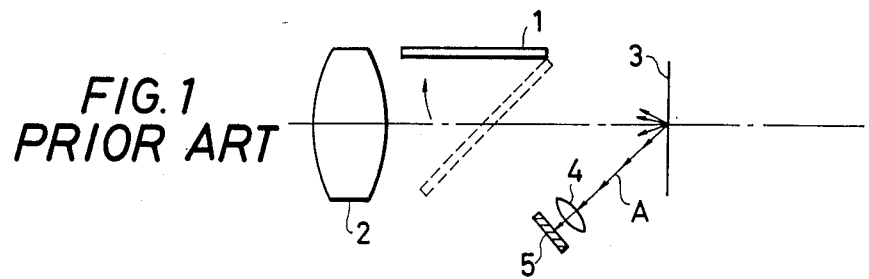
FIG. 1 is a diagrammatic illustration showing an example of conventional real-time light-measuring systems.

The present invention will be described hereunder based on the embodiments illustrated in the drawings.

Figure 2:
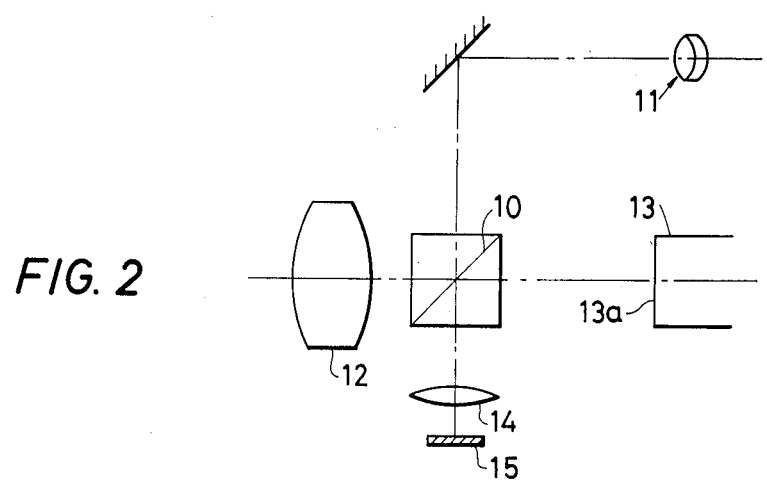
FIG. 2 is a diagrammatic illustration showing a first embodiment of the real-time light-measuring system according to the present invention.

To begin with, in FIG. 2, reference numeral 10 represents a half-mirror for splitting a light and leading the split lights to an image-pickup surface and to a view-finder optical system 11, respectively; 12 a photographing lens; 13 an image-pickup device such as an electronic image-pickup tube or a solid-state image-pickup device, whose image-pickup surface 13a having a high reflectivity is disposed at an image forming position of the photographing lens 12; 14 a light-measuring optical system; and 15 a light-measuring device. The above-mentioned parts are arranged so that the light reflected at the image-pickup surface 13a of the image-pickup device 13 is further reflected at the rear face of the half-mirror 10 to imping onto the light-measuring device 15 via the light-measuring optical system 14.

According to the embodiment constructed as described above, the regular reflection light produced by the image-pickup surface 13a and carrying bright-and-dark information of the image of an object to be photographed projected by the photographing lens 12 onto said image-pickup surface 13a of the image-pickup device 13 is reflected at the rear face of the half-mirror 10 to emit to the outside of the photographing light path and impinges, on the optical axis of this latter reflection light, onto the light-measuring device 15 via the light-measuring optical system 14. Thus, an ample amount of light arrives at the light-measuring device 15, which performs a measurement of this light on the optical axis which is positioned on the outside of the photographing light path.

Figure 3:
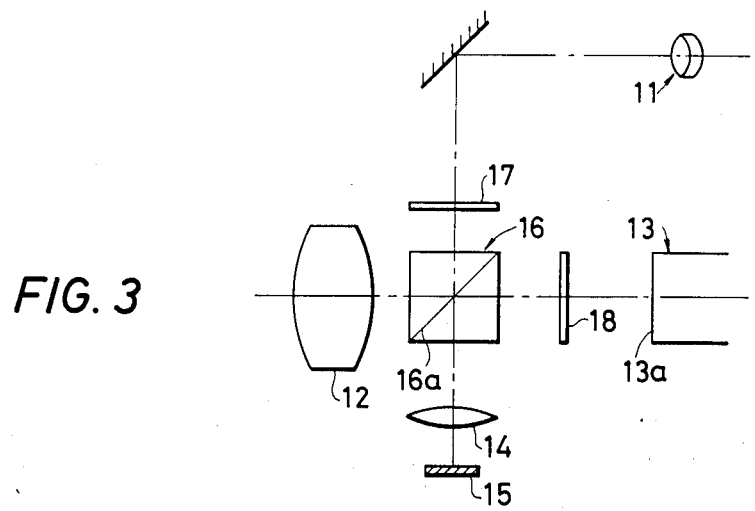
FIG. 3 is a diagrammatic illustration showing a second embodiment of the present invention.

FIG. 3 shows another embodiment of the present invention, in which: reference numeral 16 represent a cemented prism constructed as a polarizer by cementing together a plurality of prisms (note: two triangle prisms in case of FIG. 3) and applying to the resulting cemented face 16a a thin film coating having a high refractive index; 17 a polarizing plate inserted in the light path of the view-finder optical system so as to allow the transmission therethrough of the reflected light (S-polarized light) which is a light having passed through the photographing lens 12 and reflected at the cemented face 16a of the cemented prism 16; 18 a ¼ wavelength plate inserted in the photographing light path.

According to the above-described construction, the polarized light which has passed through the photographing lens 12 and further through the cemented face 16a of the cemented prism 16 passes through the ¼ wavelength plate 18 to focus at the image-pickup surface 13a of the image-pickup device 13; and the regular reflection light produced by the image-pickup surface 13a passes again through the ¼ wavelength plate 18 and then is reflected at the cemented face 16a of the cemented prism 16, and emits to the outside of the photographing light path to impinge, on the optical axis of this reflection light, onto the light-measuring device 15 via the light-measuring optical system 14. As a result, an ample amount of light arrives at the light-measuring device 15. What is more, the measurement of light is performed on an optical axis which is positioned outside the photographing light path. On the other hand, those stray lights coming from the view-finder optical system first pass through the polarizing plate 17 and then they are reflected at the cemented face 16a of the cemented prism 16, with the result that there arises no such a drop, in degree, of light-measurement precision as would be caused by the stray lights as they travel from the view-finder optical system 11 and enter into the light-measuring device 15.

Figure 4:
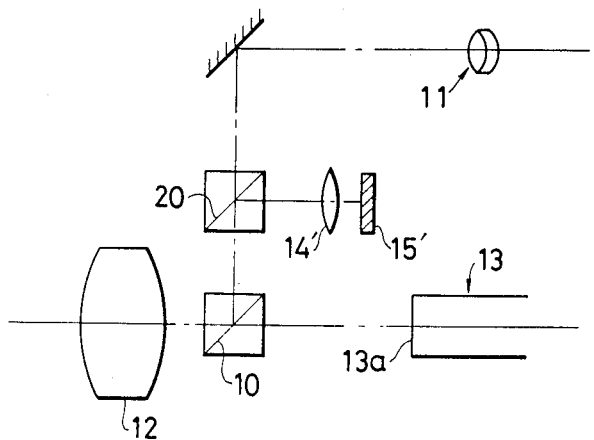
FIGS. 4 and 5 are diagrammatic illustrations of respectively different further embodiments of the realtime light-measuring system according to the present invention.
Figure 5:
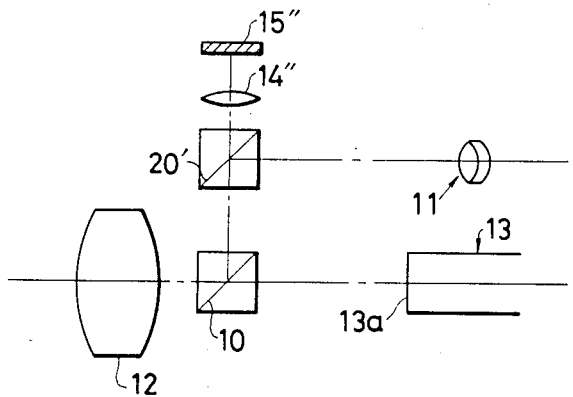

FIG. 4 shows an embodiment having a further simplified construction. Reference numeral 20 represents a dichroic mirror (or a half-mirror) which is capable of reflecting near-infrared lights and which is disposed in the view-finder light path to allow the incidence, onto a light-measuring device 15' via a light-measuring optical system 14', of a portion of the light split by the half-mirror 10 to be directed toward the view-finder optical system 11. The near-infrared light (or the reflection light) reflected at the dichroic mirror (or a half-mirror) 20 impinges, via the light-measuring optical system 14', onto the light-measuring device 15' which is sensitive to such near-infrared lights, whereby a measurement of light is performed. It should be noted here that this measurement of light can be performed on the optical axis of this reflection light without requiring the use of such expensive optical devices are a polarizer, a ¼ wavelength plate or a polarizing plate, and also without being affected by the stray lights coming from the view-finder optical system. It should be noted here also that, in the above-mentioned case, arrangement may be provided so that the view-finder optical system 11 and the light-measuring system are replaced in position relative to each other to provide a construction such that, as shown in FIG. 5, the light having passed through a dichroic mirror (or a half-mirror) 20' will impinge onto a light-measuring device 15'' via a light-measuring optical system 14''. According to the embodiments shown in FIGS. 4 and 5, the light-measuring devices 15' and 15'' can be disposed at a position conjugate with the image-pickup surface 13a. Here, "a conjugate position" means a relationship so that, when an image of an object to be photographed is formed on an image-pickup surface through a photographing lens, a same image of the object is formed also on a light receiving element for light measurement.) Therefore, by the use of, for example, a solid-state image-pickup device to serve as a light-measuring device, it becomes possible also to perform an average measurement of light at the image-pickup surface, or to perform a central selective light measurement or like measurements.

As described above, according to the present invention, arrangement is provided so that a measurement of light is performed on the axis of the reflection light of the photographing optical system. This makes it possible for an ample amount of light to reach the light-measuring device, and moreover the light-measurement is carried out on the outside of the photographing light path. Thus, the present invention is very effective in view of such advantages that, in a single-lens reflex camera having high reflectivity, a real-time light-measurement is performed with a high precision. It is needless to say that the dichroic mirror can reflect near-infrared lights as described in connection with the embodiment of FIG. 4 but permits visible lights to pass therethrough.

What is claimed is:

1. A light-measuring system for a single-lens reflex camera, comprising:
    a partially reflecting means disposed on the photographing optical axial to split a light coming from an object to be photographed and to lead the split lights toward an image-pickup device having an image-pickup surface of a high reflectivity and toward a view-finder optical system, respectively, said partially reflecting means being a cemented face of a cemented prism constructed as a polarizer by an application thereonto of a thin film coating having a high refractive index; and
    a light-measuring means disposed on the optical axis of a light from said image-pickup surface reflected by said partially reflecting means to receive the said light from said image-pickup surface, said light-measuring system further comprising a polarizing plate disposed between said cemented face and said view-finder optical system, and a ¼ wavelength plate disposed between said cemented face and said image-pickup surface.

2. A light-measuring system for a single-lens reflex camera according to claim 1, wherein:
    said light-measuring system further comprises: a dichroic mirror disposed on the optical axis of the said split light directed to said view-finder optical system to reflect near-infrared lights, and
    said light-measuring means is sensitive to near-infrared lights.

3. A light-measuring system for a single-lens reflex camera according to claim 2, wherein:

said light-measuring means is disposed at a position conjugate with said image-pickup surface of the image-pickup device.

4. A light-measuring system for a single-lens relfex camera according to claim 1, wherein:
said light-measuring system further comprises: a dichroic mirror disposed on the optical axis of the said split light directed to said view-finder optical system to transmit near-infrared lights therethrough, and
said light-measuring means is sensitive to near-infrared lights.

5. A light-measuring system for a single-lens reflex camera according to claim 4, wherein:
said light-measuring means is disposed at a position conjugate with said image-pickup surface of the image-pickup device.

* * * * *